United States Patent
Iko et al.

(10) Patent No.: US 10,489,194 B2
(45) Date of Patent: Nov. 26, 2019

(54) DYNAMIC GENERATION AND ADJUSTMENT OF SCHEDULING LOGIC FOR PACKET PROCESSING

(71) Applicant: Huawei Technologies Co., Ltd., Shenzhen, Guangdong (CN)

(72) Inventors: Azoulay Iko, Munich (DE); Hewei Liu, Hangzhou (CN); Kun Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 112 days.

(21) Appl. No.: 14/587,666

(22) Filed: Dec. 31, 2014

(65) Prior Publication Data

US 2015/0121385 A1   Apr. 30, 2015

Related U.S. Application Data

(63) Continuation of application No. PCT/CN2014/071176, filed on Jan. 23, 2014.

(30) Foreign Application Priority Data

Jul. 2, 2013  (CN) .......................... 2013 1 0274883

(51) Int. Cl.
*G06F 9/48* (2006.01)
*G06F 9/54* (2006.01)
(Continued)

(52) U.S. Cl.
CPC .............. *G06F 9/4881* (2013.01); *G06F 9/54* (2013.01); *H04L 63/0263* (2013.01); *H04L 67/327* (2013.01)

(58) Field of Classification Search
CPC ..... H04L 67/327; H04L 63/0263; G06F 9/54; G06F 9/4881
See application file for complete search history.

(56) References Cited

U.S. PATENT DOCUMENTS

| 6,412,005 B1 | 6/2002 | Bennett |
| 6,882,642 B1 * | 4/2005 | Kejriwal ................. H04L 47/10 370/388 |

(Continued)

FOREIGN PATENT DOCUMENTS

| CA | 2 406 089 A1 | 3/2004 |
| CN | 1501643 A | 6/2004 |

(Continued)

*Primary Examiner* — Meng Ai T An
*Assistant Examiner* — Michael W Ayers
(74) *Attorney, Agent, or Firm* — Conley Rose, P.C.

(57) ABSTRACT

A service scheduling method, including: obtaining scheduling information of multiple services deployed on a network device; generating scheduling logic according to the scheduling information, invoking, according to the generated scheduling logic, each processing module to process a packet received by the network device, and invoking, according to the scheduling point information of each service, a corresponding service at a scheduling point of each service. Accordingly, the embodiments of the present invention also provide a service scheduling apparatus and a network device. In the embodiments of the present invention, by using the foregoing technical solutions, a conventional packet processing process is segmented in detail, multiple service scheduling points are defined, and a required service is flexibly scheduled according to a packet processing result, which avoids repeated scheduling, improves flexibility and performance of service scheduling, and increases competitiveness of a network device.

13 Claims, 9 Drawing Sheets

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 7,185,342 | B1* | 2/2007 | Carrer | G06F 9/5038 |
| | | | | 709/219 |
| 7,188,250 | B1* | 3/2007 | Alfieri | H04L 9/06 |
| | | | | 713/161 |
| 7,626,986 | B1* | 12/2009 | Tse-Au | H04L 49/45 |
| | | | | 370/389 |
| 8,127,262 | B1* | 2/2012 | James-Roxby | H04L 47/2441 |
| | | | | 716/101 |
| 8,356,332 | B2* | 1/2013 | Menten | H04L 63/0263 |
| | | | | 709/217 |
| 2002/0159411 | A1 | 10/2002 | Airy et al. | |
| 2003/0043848 | A1* | 3/2003 | Sonksen | H04L 69/22 |
| | | | | 370/474 |
| 2005/0289244 | A1* | 12/2005 | Sahu | H04L 67/2819 |
| | | | | 709/249 |
| 2009/0158428 | A1* | 6/2009 | Wang | H04L 63/0245 |
| | | | | 726/22 |
| 2010/0115048 | A1 | 5/2010 | Scahill | |
| 2012/0047514 | A1 | 2/2012 | Seo et al. | |
| 2012/0324510 | A1 | 12/2012 | Leley et al. | |
| 2013/0024870 | A1* | 1/2013 | Yamashita | G06F 9/4881 |
| | | | | 718/104 |
| 2013/0103829 | A1* | 4/2013 | Doi | G06F 9/485 |
| | | | | 709/224 |
| 2014/0307744 | A1* | 10/2014 | Dunbar | H04L 45/44 |
| | | | | 370/401 |
| 2015/0003453 | A1* | 1/2015 | Sengupta | H04L 45/74 |
| | | | | 370/392 |
| 2015/0341429 | A1* | 11/2015 | Gandal | H04L 67/104 |
| | | | | 709/201 |
| 2016/0048406 | A1* | 2/2016 | Cucinotta | G06F 9/4881 |
| | | | | 718/1 |
| 2016/0182684 | A1* | 6/2016 | Connor | G06F 9/45558 |
| | | | | 709/203 |

FOREIGN PATENT DOCUMENTS

| | | |
|---|---|---|
| CN | 101442513 A | 5/2009 |
| CN | 101510164 A | 8/2009 |
| CN | 102411510 A | 4/2012 |
| CN | 102694926 A | 9/2012 |
| CN | 103346980 A | 10/2013 |
| JP | 58107759 A | 6/1983 |
| JP | 2006-501543 A | 1/2006 |
| JP | 2011-233086 A | 11/2011 |
| KR | 1020120017294 | 2/2012 |
| WO | WO 2004/029805 A2 | 4/2004 |
| WO | WO 2014/194677 A1 | 12/2014 |

* cited by examiner

DYNAMIC GENERATION AND ADJUSTMENT OF SCHEDULING LOGIC FOR PACKET PROCESSING

CROSS-REFERENCE TO RELATED APPLICATIONS

This application is a continuation of International Application No. PCT/CN2014/071176, filed on Jan. 23, 2014, which claims priority to Chinese Patent Application No. 201310274883.0, filed on Jul. 2, 2013, both of which are hereby incorporated by reference in their entireties.

TECHNICAL FIELD

The present invention relates to the field of communications technologies, and in particular, to a service scheduling method and apparatus, and a network device, and a communications system.

BACKGROUND

In a communications system, application services on a network device, especially on a core network device such as a router, a switch, and a gateway, continuously increase. As shown in FIG. 1, at an application layer (a service layer), multiple types of services are generally deployed, for example, a uniform resource locator filter (Uniform Resource Locator Filter, URLF), a WAN optimization controller (WOC), an application delivery controller (ADC), a security service such as an intrusion prevention system (IPS), a distributed denial of service (DDOS), and an firewall (FW), as well as bandwidth control, and quality of service (QoS) control. Execution of each service depends on specific processing by a data processing layer on network data, for example, a deep packet inspection (DPI), a secure sockets layer (SSL), and Lempel-Ziv (LZ) compression. Different services have different requirements on a data processing manner and a time sequence. The purpose of service scheduling is to meet different service requirements, perform reasonable scheduling, and avoid repeated scheduling and over-scheduling.

In the prior art, a service-based scheduling manner is generally adopted. In this scheduling manner, each service is executed separately, and meanwhile some universal functions (for example, IP fragmentation processing) are encapsulated into a data processing module; and each processing module is directly invoked when necessary. A service execution sequence is generally preset according to a service requirement of a user. When a device receives a packet, the device sends the packet to each service for processing according to the sequence. When a service needs to perform specific processing on the packet, the service invokes a related processing module according to logic of the service to perform processing. As shown in FIG. 2, assuming that a device is configured with an IPS service and an ADC service, when a packet is processed, the IPS service separately invokes a DPI module and an LZ module according to a requirement, while the ADC service invokes the DPI module, the LZ module, and an SSL module.

According to the foregoing process description, the scheduling manner in the prior art has the following two problems: The first problem is that a service execution sequence is fixed and lack of flexibility, and the second problem is that a same processing module is invoked for multiple times and a case that a packet is processed repeatedly exists, which affects the service execution efficiency.

SUMMARY

Embodiments of the present invention provide a service scheduling method, a network device, and a communications system, so as to improve flexibility and performance of service scheduling.

According to a first aspect, an embodiment of the present invention provides a service scheduling method, including:

obtaining, by a scheduler, scheduling information of multiple services deployed on a network device;

generating, by the scheduler, scheduling logic according to the scheduling information of the multiple services, where the scheduling logic includes an execution sequence of multiple processing modules that process a packet and a mapping relationship between each service and a scheduling point of each service, where the scheduling point of each service is a logical control point at which the scheduler schedules the service; and invoking, by the scheduler, according to the execution sequence of the multiple processing modules that is included in the generated scheduling logic, each processing module of the multiple processing modules successively to process a packet received by the network device, and invoking a corresponding service at each scheduling point according to the mapping relationship included in the scheduling logic.

In a first possible implementation manner of the first aspect, the obtaining, by a scheduler, scheduling information of multiple services deployed on a network device includes:

receiving, by the scheduler, a configuration file delivered by the network device, and parsing the configuration file to obtain the scheduling information of the multiple services.

With reference to the first aspect or the first possible implementation manner of the first aspect, in a second possible implementation manner, the scheduling information of each service includes a service rule of each service and a dependence relationship between each service and another service; and the generating, by the scheduler, scheduling logic according to the scheduling information of the multiple services includes:

determining, by the scheduler, according to a condition included in the service rules of the multiple services, N processing modules that are required for determining whether the condition is met, and at least one scheduling point, between processing modules of the N processing modules and/or inside each processing module of the N processing modules, at which a service needs to be scheduled; and generating a mapping relationship between each scheduling point and a service that needs to be invoked at the scheduling point; where the network device includes M processing modules, M and N are positive integers greater than or equal to 1, and N is less than or equal to M; and determining an execution sequence of the N processing modules according to the dependence relationship between the services, where the scheduling logic includes the execution sequence of the N processing modules and the mapping relationship between each scheduling point at which a service needs to be scheduled and a service that needs to be invoked at the scheduling point, where each scheduling point is between the processing modules of the N processing modules and/or inside each processing module of the N processing modules.

With reference to the second possible implementation manner of the first aspect, in a third possible implementation manner, the invoking, according to the execution sequence of the multiple processing modules that is included in the generated scheduling logic, each processing module of the multiple processing modules successively to process a packet received by the network device includes:

invoking, according to the determined execution sequence of the N processing modules, a corresponding processing module successively to process the packet received by the network device, to obtain N packet processing results.

With reference to the second or the third possible implementation manner of the first aspect, in a fourth possible implementation manner, the invoking a corresponding service at each scheduling point according to the mapping relationship included in the scheduling logic includes:

determining, at each scheduling point, between the processing modules of the N processing modules and/or inside each processing module of the N processing modules, at which a service needs to be scheduled, all services corresponding to the scheduling point according to the generated mapping relationship;

determining, according to at least one of the packet processing results, whether a scheduling condition of each service of all the services is met, and determining a service meeting the scheduling condition as the service that needs to be scheduled at the scheduling point; and if there are multiple services that need to be scheduled, invoking, according to a descending order of a priority of each service of the services that need to be scheduled, the services that need to be scheduled successively at the scheduling point; and if there is only one service that needs to be scheduled, invoking the service that needs to be scheduled directly at the scheduling point.

With reference to the third or the fourth possible implementation manner of the first aspect, in a fifth possible implementation manner, the service scheduling method further includes: adjusting, according to results of processing, on the packet received by the network device, by P processing modules among the N processing modules, an execution sequence of N-P processing modules, in addition to the P processing modules, among the N processing modules, and re-determining a scheduling point, between processing modules of the N-P processing modules and/or inside each processing module of the N-P processing modules, at which a service needs to be scheduled, where P is a positive integer greater than 1 and P is less than N.

According to a second aspect, an embodiment of the present invention further provides a service scheduling apparatus, including: an obtaining module, configured to obtain scheduling information of multiple services deployed on a network device;

a scheduling logic generating module, configured to generate scheduling logic according to the scheduling information obtained by the obtaining module, where the scheduling logic includes an execution sequence of multiple processing modules that process a packet and a mapping relationship between each service and a scheduling point of each service, where the scheduling point of each service is a logical control point at which the service scheduling apparatus schedules the service; and a scheduling module, configured to invoke, according to the execution sequence of the multiple processing modules that is included in the generated scheduling logic, each processing module of the multiple processing modules successively to process a packet received by the network device, and invoke a corresponding service at each scheduling point according to the mapping relationship included in the scheduling logic.

In a first possible implementation manner of the second aspect, the obtaining module is specifically configured to receive a configuration file delivered by the network device, and parse the configuration file to obtain the scheduling information of the multiple services.

With reference to the second aspect or the first possible implementation manner of the second aspect, in a second possible implementation manner, the scheduling information of each service includes a service rule of each service and a dependence relationship between each service and another service; and the scheduling logic generating module includes:

a mapping unit, configured to determine, according to a condition included in the service rules of the multiple services, N processing modules that are required for determining whether the condition is met, and at least one scheduling point, between processing modules of the N processing modules and/or inside each processing module of the N processing modules, at which a service needs to be scheduled, and generate a mapping relationship between each scheduling point and a service that needs to be invoked at the scheduling point; where the network device includes M processing modules, M and N are positive integers greater than or equal to 1, and N is less than or equal to M; and a sorting unit, configured to determine an execution sequence of each processing module of the N processing modules according to the dependence relationship between the services, where the scheduling logic includes the execution sequence of the N processing modules and the mapping relationship between each scheduling point at which a service needs to be scheduled and a service that needs to be invoked at the scheduling point, where each scheduling point is between the processing modules of the N processing modules and/or inside each processing module of the N processing modules.

With reference to the second possible implementation manner of the second aspect, in a third possible implementation manner, the scheduling module is specifically configured to invoke, according to the determined execution sequence of the N processing modules, each processing module of the multiple processing modules successively to process the packet received by the network device, to obtain N packet processing results.

With reference to the second or the third possible implementation manner of the second aspect, in a fourth possible implementation manner, the scheduling module is specifically configured to determine, at each scheduling point determined by the mapping unit, all services corresponding to the scheduling point according to the generated mapping relationship; determine, according to at least one of the packet processing results, whether a scheduling condition of each service of all the services is met, and determine a service meeting the scheduling condition as the service that needs to be scheduled at the scheduling point; if there are multiple services that need to be scheduled, invoke, according to a descending order of a priority of each service of the services that need to be scheduled, the services that need to be scheduled successively at the scheduling point; and if there is only one service that needs to be scheduled, invoke the service that needs to be scheduled directly at the scheduling point.

With reference to the third or the fourth possible implementation manner of the second aspect, in a fifth possible implementation manner, the service scheduling apparatus further includes:

an adjusting module, configured to adjust, according to results of processing, on the packet received by the network device, by P processing modules among the N processing modules, an execution sequence of N-P processing modules, in addition to the P processing modules, among the N processing modules, and re-determine a scheduling point, between processing modules of the N-P processing modules and/or inside each processing module of the N-P processing modules, at which a service needs to be scheduled, where P is a positive integer greater than 1 and P is less than N.

According to a third aspect, an embodiment of the present invention further provides a network device, including a transceiver module, a scheduler, and multiple processing modules, where:

the transceiver module is configured to receive a packet and scheduling information of multiple services deployed on the network device;

the scheduler is configured to generate scheduling logic according to the scheduling information of the multiple services, where the scheduling logic includes an execution sequence of multiple processing modules that process the packet received by the transceiver module and a mapping relationship between each service and a scheduling point of each service, where the scheduling point of each service is a logical control point at which the scheduler schedules the service; and the scheduler is further configured to invoke, according to the execution sequence of the multiple processing modules that is included in the generated scheduling logic, each processing module of the multiple processing modules successively to process the network packet received by the transceiver module, and invoke a corresponding service at each scheduling point according to the mapping relationship included in the scheduling logic.

In a first possible implementation manner of the third aspect, the transceiver module is specifically configured to receive a configuration file delivered by the network device, and parse the configuration file to obtain the scheduling information of each service.

With reference to the third aspect or the first possible implementation manner of the third aspect, in a second possible implementation manner, the scheduling information of each service includes a service rule of each service and a dependence relationship between each service and another service; and the scheduler is specifically configured to determine, according to a condition included in the service rules of the multiple services, all processing modules that are required for determining whether the condition is met, and at least one scheduling point, between processing modules of all the processing modules and/or inside each processing module of all the processing modules, at which a service needs to be scheduled, and generate a mapping relationship between each scheduling point and a service that needs to be invoked at the scheduling point; and determine an execution sequence of all the processing modules according to the dependence relationship between the services, where the scheduling logic includes an execution sequence of the N processing modules and a mapping relationship between each scheduling point at which a service needs to be scheduled and a service that needs to be invoked at the scheduling point, where each scheduling point is between processing modules of the N processing modules and/or inside each processing module of the N processing modules.

With reference to the second possible implementation manner of the third aspect, in a third possible implementation manner, the scheduler is specifically configured to determine, at each scheduling point that is determined, all services corresponding to the scheduling point according to the generated mapping relationship; determine, according to at least one of the packet processing results, whether a scheduling condition of each service of all the services is met, and determine a service meeting the scheduling condition as the service that needs to be scheduled at the scheduling point; if there are multiple services that need to be scheduled, invoke, according to a descending order of a priority of each service of the services that need to be scheduled, the services that need to be scheduled successively at the scheduling point; and if there is only one service that needs to be scheduled, invoke the service that needs to be scheduled directly at the scheduling point.

With reference to the third aspect or the first, the second, or the third possible implementation manner of the third aspect, in a fourth possible implementation manner, the multiple processing modules are deployed on multiple processor cores of the network device and the scheduler is deployed on the multiple processor cores in a distributed manner.

It may be known from the foregoing technical solutions, by using the service scheduling method and apparatus and the network device provided by the embodiments of the present invention, a customizable multiservice scheduler is used to implement flexible scheduling of multiple services, and the scheduler obtains scheduling information of the services. In addition, a conventional packet processing process is segmented in detail, scheduling logic is generated dynamically according to the scheduling information of the services, and multiple service scheduling points are defined, so as to schedule a required service flexibly and avoid repeated scheduling, which improves flexibility and performance of service scheduling and further increases competitiveness of a network device.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the present invention clearer, the following clearly describes the technical solutions of the present invention with reference to the accompanying drawings in the embodiments of the present invention. Apparently, the described embodiments are a part of the embodiments of the present invention. Based on the following embodiments of the present invention, persons skilled in the art may still obtain, by equivalently changing a part of or even all of technical features without creative efforts, other embodiments that can solve a technical problem of the present invention and achieve a technical effect of the present invention. The embodiments obtained by changing shall evidently fall within the scope disclosed in the present invention.

Figure 1:
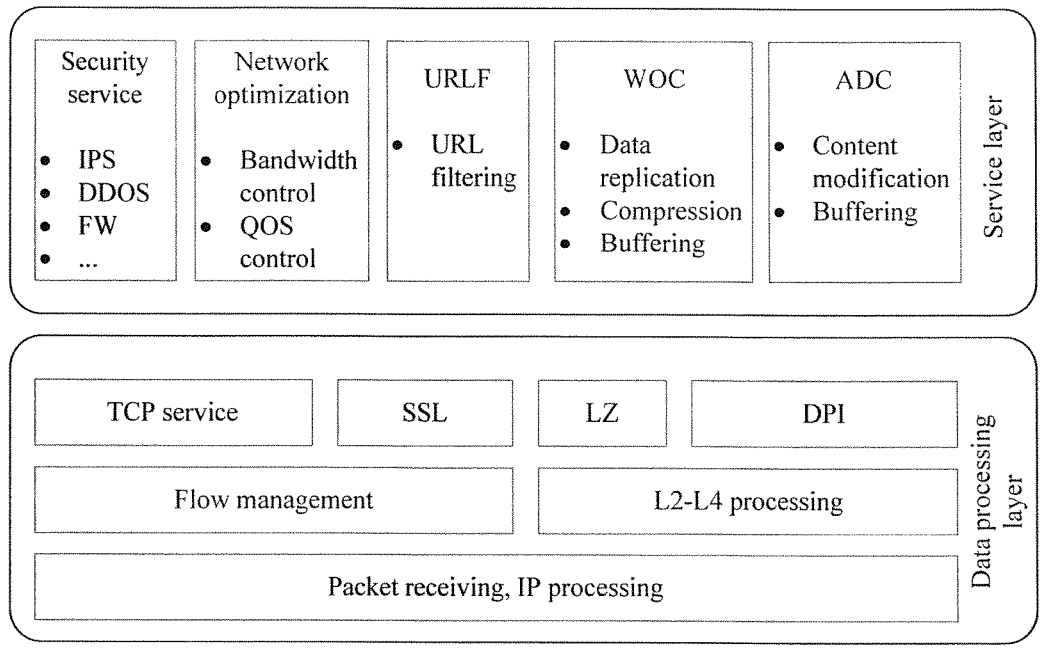
FIG. 1 is a schematic diagram of a hierarchical deployment manner of multiservice policy control according to the present invention.
Figure 2:
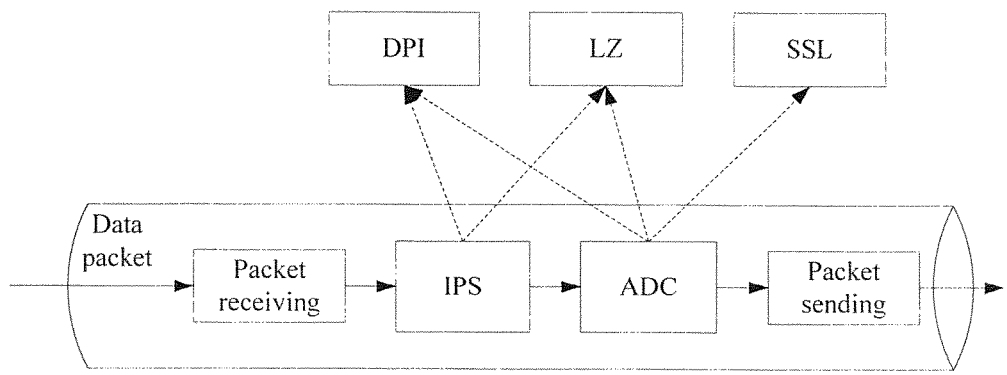
FIG. 2 is a schematic diagram of a service scheduling method in the prior art.
Figure 3:
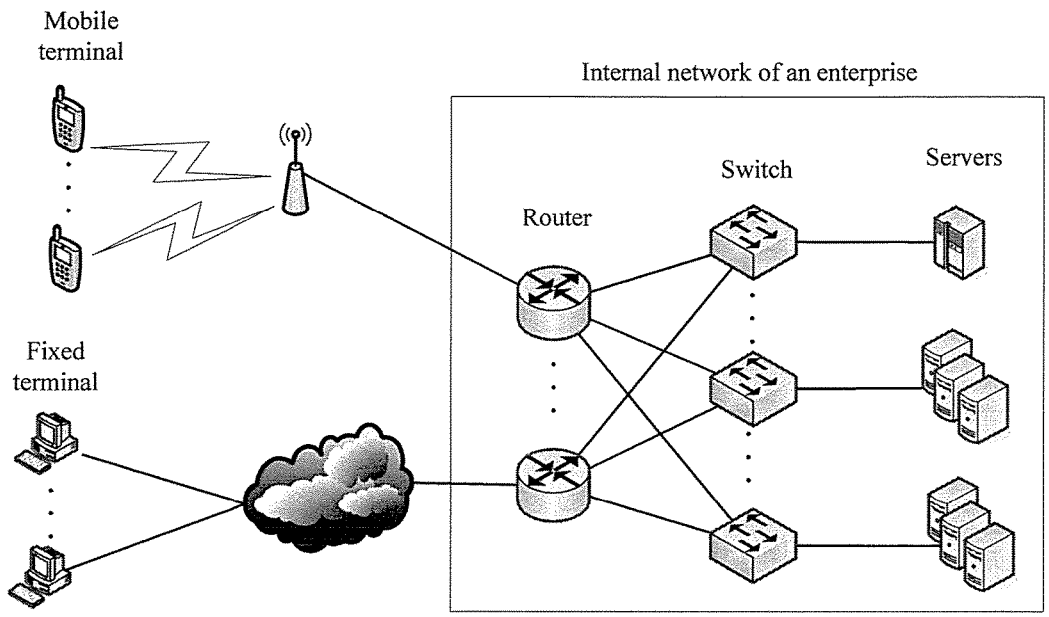
FIG. 3 is a schematic diagram of a network of an enterprise private cloud according to an embodiment of the present invention.

To make persons of ordinary skill in the art better understand the technical solutions provided by the embodiments of the present invention, an application scenario of the technical solutions provided by the embodiments of the present invention is first introduced. The technical solutions provided by the embodiments of the present invention can be applied to a multi-service policy control scenario, for example, a home area network, an access network, an aggregation network, a backbone network, an enterprise network, an operator network, and various private/public clouds. The following uses an example that an enterprise network serves as a typical application scenario for simple description. FIG. 3 describes a common scenario where an enterprise provides services externally, and a user accesses a network by using a mobile terminal or a fixed terminal to request a service. An internal network of an enterprise is generally formed by network devices such as a router (Router), a switch (Switch) and a server. According to a requirement, services such as an IPS, bandwidth control, URL filtering, a WOC, and a ADC are deployed on one or more network devices. Generally, multiple services are deployed on a same device. In this case, the multiple services on the network device need to be properly scheduled to improve flexibility and performance of service processing. The technical solutions provided by the embodiments of the present invention are applicable to such a multiservice processing scenario. For example, the router or the switch shown in FIG. 3 may be used to implement the technical solutions provided by the embodiments of the present invention. It should be noted that the enterprise network scenario is only a typical application scenario of the technical solutions of the present invention and does not constitute a limitation on the application scenario of the present invention. The technical solutions of the embodiments of the present invention are always applicable to other application scenarios where scheduling of multiple types of services is involved.

Figure 4:
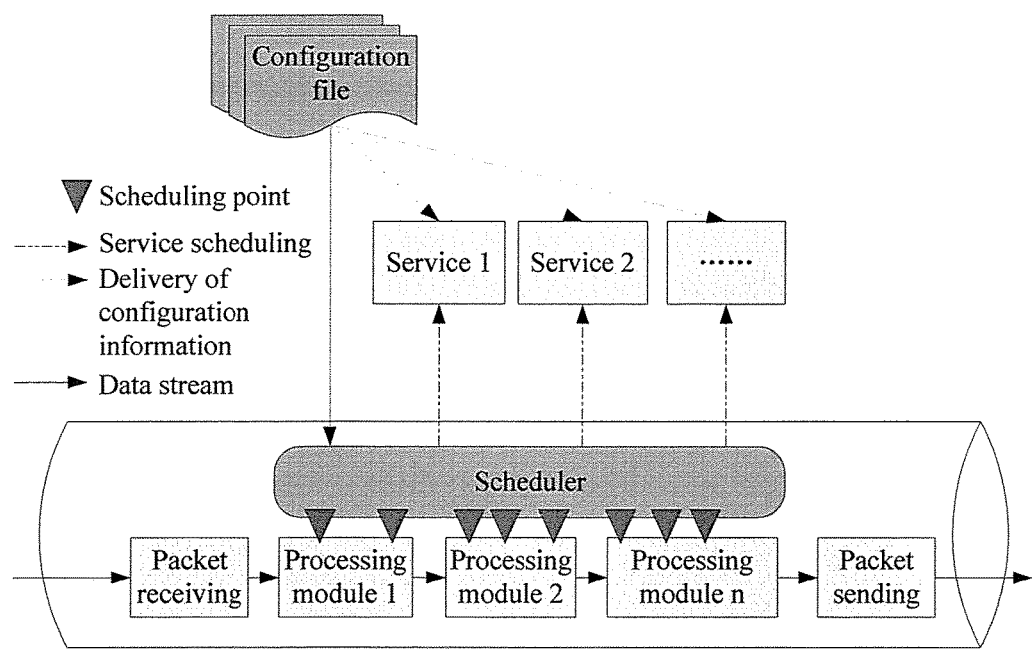
FIG. 4 is a schematic flowchart of a service scheduling method according to an embodiment of the present invention.
Figure 5:
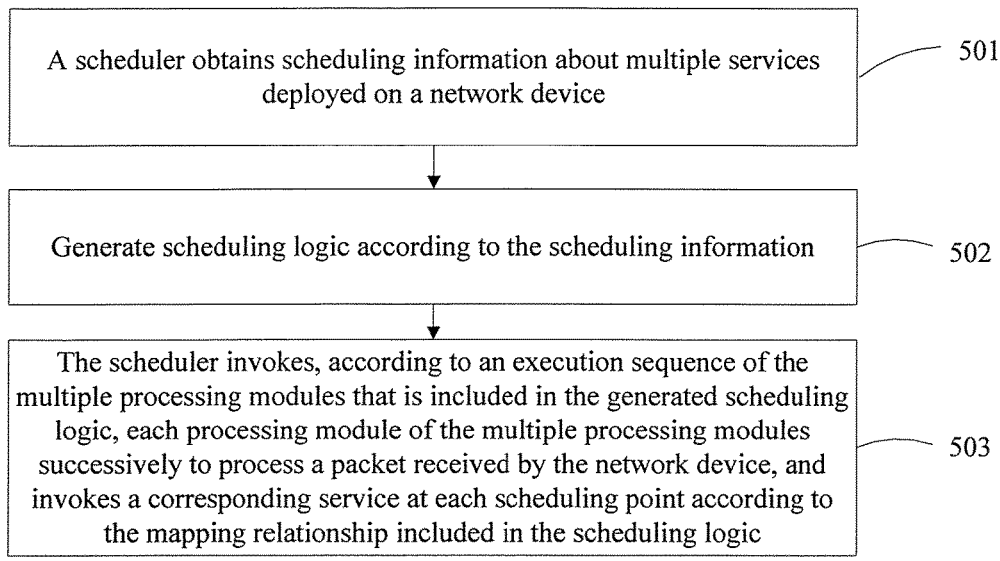
FIG. 5 is a flowchart of a service scheduling processing method according to an embodiment of the present invention.

An embodiment of the present invention provides a service scheduling method. As shown in FIG. 4, assuming that multiple services (for example, service 1 and service 2 shown in FIG. 4) are running on a current network device and one or more data processing modules, for example, a processing module 1, a processing module 2 ... processing module n shown in FIG. 4, are deployed on the current network device, a scheduler is configured to implement a service scheduling function. Specifically, the scheduler obtains, based on a configuration file that is configured by a user and includes scheduling information of each service, packet processing result information at each scheduling point in a process of processing a packet by each processing module, and schedules a corresponding service to process the packet according to a service requirement, where the scheduling point is a logical control point at which the scheduler performs service scheduling and is combined with a processing module. Based on the foregoing description, the service scheduling method provided by this embodiment of the present invention may be specifically implemented by the scheduler and the scheduler may be deployed on the router or the switch shown in FIG. 3. FIG. 5 describes a method process of service scheduling performed by a scheduler. According to FIG. 5, the method process includes the following steps:

Step 501: The scheduler obtains scheduling information of multiple services deployed on a network device.

It should be noted that the scheduling information of each service of the foregoing multiple services is used to indicate a policy of scheduling the service. The scheduling information of each service may include but is not limited to policy information of the service, information about processing modules on which the service depends, information about other services on which the service depends, and the like. It should be noted that a scheduling point in this embodiment of the present invention is determined by a combination of a service and a processing module, and a processing module is configured to perform specific processing on a packet, for example, IP fragmentation processing, data stream management, L1-L3 processing, L7 processing, and the like.

In an embodiment, the scheduling information of each foregoing service may be an explicitly specified rule or timing for scheduling the service, for example, the scheduling information may be used to instruct the scheduler to schedule a certain service after a specific processing module completes processing the packet or to schedule a certain service after a stage at which a specific processing module completes specific processing on the packet. For example, it may be specified that an IPS service is scheduled after layer 4 processing on the packet is completed and an ADC service is scheduled after parsing of a header field of the packet is completed. Further, the scheduling information may further include scheduling information of a specific data stream specified for a service. For example, when an ADC service is configured, the scheduler may be specified to process data streams of an 8080 port only or process data streams of a specific IP address or a specific protocol, or the like.

In another embodiment, the scheduling information of each service may also be scheduling information that is implicitly specified by extracting from a service rule of the service in a manner such as parsing and extraction. That is, determining, according to a condition included in a service rule corresponding to the service, processing modules that perform specific processing on the packet and on which determination of the condition included depends, as well as information about the modules on which the service depends. It should be noted that a service rule is a rule to be followed when a service is executed. One service rule includes two parts: a condition and an action. Specifically, one service rule may include one or more conditions and multiple conditions in the same service rule may be related to packet information of different levels or different dimensions, or more precisely, if it is to determine whether each service rule is matched, it needs to determine whether a condition included in the service rule is met. However, determination of the condition in the service rule depends on at least information about one dimension of the packet. For example, in a rule if (IP=1.1.1.1 && HTTP. host=www.huawei.com) then do ADC, "IP=1.1.1.1" and "HTTP. host=www.huawei.com" are two parallel conditions, where the former is a layer3 condition and the latter is a layer7 condition, and the two conditions are in an "And" logical relationship. Therefore, the execution of the ADC service needs to depend on that layer 3 and layer 7 processing on the packet is completed.

Using the IPS service as an example, assuming that a service rule included in the IPS service is if (HTTP. Request.URL=www.huawei.com) {do action}, scheduling information of the service may be obtained by parsing the service rule, where the scheduling information includes the following: A scheduling position is at a request direction of a data stream; an identifying module needs to be scheduled to identify a protocol of the data stream; and if the protocol is the HTTP protocol, a parsing module also needs to be invoked to obtain, by parsing, URL information.

In a more exemplary embodiment, the scheduling information of each service may further include priority information of the service, where priority information of a service is used to indicate a priority of the service. If multiple services need to be scheduled at the same scheduling point, a service of a higher priority is scheduled first, where the scheduling point is a logical control point at which the scheduler performs service scheduling. For example, both the IPS service and the ADC service may be scheduled during layer 7 processing, and a priority may be configured, so that the IPS service is scheduled before the ADC service.

It should be noted that the scheduling information of the foregoing multiple services may be included in a configuration file that is configured by a user or generated by the network device. Before service scheduling is performed, the network device delivers the configuration file to the scheduler, and the scheduler may parse the configuration file to obtain the scheduling information of each service.

In this way, integration of the service and the scheduler is implemented. Specifically, the configuration file may be delivered in multiple manners, for example, delivered in a universal file import manner, delivered in a GUI interface import manner, configured in a CLI command line manner, delivered by a network management system of the network device, or the like, which is not specifically limited herein.

Step 502: Generate scheduling logic according to the scheduling information, where the scheduling logic includes an execution sequence of multiple processing modules that process the packet and a mapping relationship between each service and a scheduling point of each service, where the scheduling point of each service is a logical control point at which the scheduler schedules the service.

In this step, the scheduler first obtains information about processing modules and services deployed on the network device, that is, the scheduler learns which processing modules and services are deployed on the current network device, where a series of scheduling points may be provided inside a processing module, that is, it may be specified that a certain service is scheduled at one scheduling point inside a certain processing module. For example, it may be specified that the IPS service is scheduled when the parsing module completes parsing the header field of the packet. In addition, a series of scheduling points may be defined between processing modules. In this way, a certain service may be scheduled after a certain processing module completes processing the packet, for example, it may be specified that the ADC service is scheduled at a scheduling point between the parsing module and an L7 processing module. In this case, the ADC service is invoked after the parsing module completes parsing the packet and before the packet is sent to the L7 processing module for processing. The scheduling point herein is a logical control point at which the scheduler performs service scheduling. After obtaining the information about the processing modules and services deployed on the network device, the scheduler further determines a scheduling point existing between processing modules and inside each processing module, a dependence relationship between the services, and the like, and generates the scheduling logic according to the scheduling information of each service. The scheduling logic includes the following main content:

(1) An execution sequence of all processing modules that need to process the packet (a sequence for processing the packet by these processing modules); and (2) Scheduling point information of each service that needs to be scheduled. Specifically, the scheduling point information of each service may include the mapping relationship between each service and the scheduling point of each service. For example, in an embodiment, an identifier of each service that needs to be scheduled may be associated with an identifier of a scheduling point at which the scheduler schedules the service, and information about the association is stored in a specific data structure to serve as the scheduling point information of the service.

In a specific embodiment, the scheduling information of each service of the multiple services deployed on the network device may specifically include the service rule of the service and the dependence relationship between the service and another service. In this situation, the scheduler may generate the scheduling logic according to the following manners:

determining, according to a condition included in all service rules corresponding to the multiple services, N processing modules that are required for determining whether the condition is met, and at least one scheduling point, between processing modules of the N processing modules and/or inside each processing module of the N processing modules, at which a service needs to be scheduled, and generating a mapping relationship between each scheduling point and a service that needs to be invoked at the scheduling point; where the network device includes M processing modules, M and N are positive integers greater than or equal to 1, and N is less than or equal to M; and determining an execution sequence of the N processing modules according to the dependence relationship between services of the multiple services, where the generated scheduling logic includes the execution sequence of the N processing modules and the mapping relationship between each scheduling point at which a service needs to be scheduled and a service that needs to be invoked at the scheduling point, where each scheduling point is between the processing modules of the N processing modules and/or inside each processing module of the N processing modules.

It should be noted that after the foregoing steps are executed, the determined execution sequence of the N modules and the foregoing mapping relationship may be integrated to serve as the generated scheduling logic. Specifically, in this embodiment of the present invention, the scheduling logic may be presented in multiple manners, such as a configuration file, a command line or a chart, which is not specifically limited herein.

It should be noted that the scheduling point in this embodiment of the present invention is not limited to a scheduling point for scheduling after a processing module completes processing the packet, but also includes a scheduling point for scheduling at different stages of processing inside the processing module. For example, if the network device is configured with a URL filtering service, the scheduler may schedule the URL filtering service after parsing of the header field is completed, and does not need to complete parsing the entire packet before scheduling the URL filtering service.

Step 503: The scheduler invokes, according to the execution sequence of the multiple processing modules that is included in the generated scheduling logic, each processing module of the multiple processing modules successively to process a packet received by the network device, and invokes a corresponding service at each scheduling point according to the mapping relationship included in the scheduling logic.

Specifically, after the scheduler generates the scheduling logic according to the manners described in step 502, the scheduler may invoke, according to the determined execution sequence of the N processing modules, a corresponding processing module successively to process the packet received by the network device, to obtain N packet processing results.

Further, the scheduler determines, at each scheduling point that is determined and according to the foregoing generated mapping relationship, all services corresponding to the scheduling point; then, the scheduler determines, according to at least one of the packet processing results, whether a scheduling condition of each service of all the services is met, and determines a service meeting the scheduling condition as the service that needs to be scheduled at the scheduling point. In an embodiment, if there is only one service that needs to be scheduled at the scheduling point, the scheduler invokes the service that needs to be scheduled directly at the scheduling point. In another embodiment, if there are multiple services that need to be scheduled at the scheduling point, the scheduler schedules, according to a descending order of a priority of each service of the services that need to be scheduled, services of different priorities that needs to be scheduled successively at the scheduling point.

It should be noted that a scheduling condition of a service is a policy of scheduling the service and is used to indicate a condition, and the service can be scheduled only when the condition is met. Specifically, there may be one or more service conditions of a service and multiple service conditions of the same service may be related to packet information of different levels or different dimensions. For example, in a scheduling condition if (IP=1.1.1.1 && HTTP. host=www.huawei.com) then invoke ADC, "IP=1.1.1.1" and "HTTP. host=www.huawei.com" are two parallel conditions, where the former is a layer3 condition and the latter is a layer7 condition, and the two conditions are in an "And" logical relationship. Therefore, when both the two service conditions are met, the ADC service can be executed.

Specifically, step 503 may be described as follows:

(1) A corresponding processing module is scheduled successively to perform packet processing according to the execution sequence of the processing modules included in the scheduling logic.

(2) According to the scheduling point information of each service included in the scheduling logic, whether a service needs to be scheduled is determined at each scheduling point inside each processing module and between processing modules; if it is determined that a service needs to be scheduled at each scheduling point inside each processing module and between processing modules, a service corresponding to the scheduling point is invoked; if it is determined that a service does not need to be scheduled at each scheduling point inside each processing module and between processing modules, the packet processing process continues until a next scheduling point at which a service needs to be scheduled is determined.

(3) When multiple services need to be scheduled at the same scheduling point, the services are scheduled according to a priority of each service.

Preferably, in another embodiment, the scheduler may further adjust, according to results of processing, on the packet received by the network device, by P processing modules among the N processing modules, an execution sequence of N-P processing modules, in addition to the P processing modules, among the N processing modules, and re-determine a scheduling point between processing modules of the N-P processing modules and/or inside each processing module of the N-P processing modules, where P is a positive integer greater than 1 and P is less than N.

Figure 6:
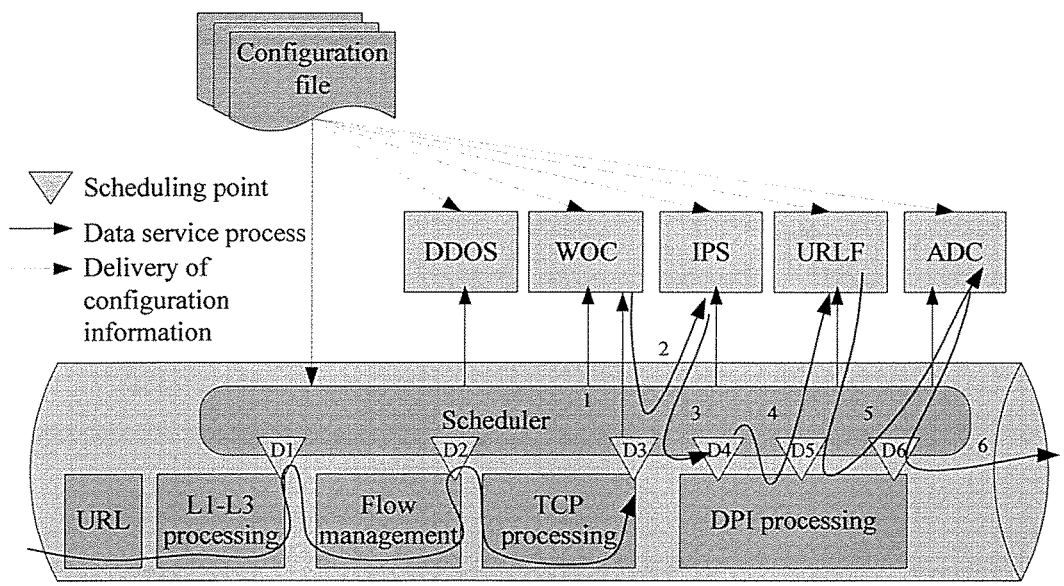
FIG. 6 is a schematic flowchart of service scheduling by a scheduler according to an embodiment of the present invention.

The following describes the foregoing steps S501 to S503 by using a specific example. As shown in FIG. 6, the scheduler receives scheduling information configured for each service, where the scheduling information of each service is listed in the following table:

| | Service name | | | | |
|---|---|---|---|---|---|
| | DDOS | WOC | ADC | IPS | URLF |
| Service rule 1 | Executed after protocol identification ends | Executed after TCP processing ends | Executed after DPI processing ends | Executed after TCP processing ends | Executed after a header field is parsed |
| Service rule 2 | The protocol type is CIFS | The protocol type is TCP | The protocol type is HTTP | The protocol type is TCP | The protocol type is HTTP |
| Service depended | null | null | null | WOC | null |

Using the IPS service as an example, it can be seen from the foregoing table that the service rule is as follows: An WOC service is executed after TCP processing on a packet/data stream with a protocol type of TCP ends and execution of the IPS service depends on the WOC service. As shown in FIG. 6, assuming that an HTTP data stream is received in a request direction, a process of generating the scheduling logic according to the scheduling information is as follows:

(a) Determine, according to the scheduling information of each service, processing modules that need to perform processing on the data stream, for example, a URL module, L1-L3 processing modules, a data stream management module, a TCP processing module, and a DPI processing module.

(b) After determining the foregoing processing modules, the scheduler may further determine all scheduling points existing between processing modules and/or inside each processing module: D1 (L1-L3 layer processing ends), D2 (data stream management ends), D3 (TCP processing ends), D4 (protocol identification ends), D5 (parsing of a packet header field ends), and D6 (DPI processing ends).

(c) Determine an execution sequence of these processing modules (assuming that the determined execution sequence is a left-to-right sequence shown in FIG. 6) according to the dependence relationship between the services, and further confirm that, among the scheduling points D1 to D6, a service needs to be scheduled at scheduling points D3 to D6 (no corresponding service needs to be scheduled at D1 and D2), and generate the mapping relationship between each scheduling point and the service that needs to be invoked at the scheduling point. For example, services corresponding to the scheduling point D3 are WOC and IPS, a service corresponding to D4 is DDOS, a service corresponding to D5 is URLF, and a service corresponding to D6 is ADC.

After the scheduling logic is generated, processing of the data stream starts:

(1) Because no service needs to be scheduled at the scheduling points D1 and D2, the data stream continues to be processed. Two services need to be scheduled at the scheduling point D3. According to service priorities, the WOC service has a priority higher than the IPS service, and thus the WOC service is first scheduled to process the data stream.

(2) The IPS service is scheduled to process the data stream.

(3) The service corresponding to the scheduling point D4 is DDOS. However, because an identification result of the data stream is not a CIFS service, the DDOS service does not need to be scheduled and the data streams continues to be processed.

(4) The URLF service is scheduled at the scheduling point D5 to process the data stream.

(5) The ADC service is scheduled at the scheduling point D6 to process the data stream.

(6) The data stream that has undergone the foregoing processing is sent.

In the service scheduling method provided by this embodiment of the present invention, a conventional packet processing process is segmented in detail, and multiple service scheduling points are defined. In addition, a service scheduling logic is dynamically determined according to scheduling information of a service; and a scheduler implements flexible scheduling of multiple services according to the scheduling logic, which avoids repeated scheduling, improves flexibility and performance of service scheduling, and increases competitiveness of a network device.

For better implementation of the foregoing solutions of the embodiments of the present invention, the following further provides a related apparatus used to implement the foregoing method.

Figure 7:
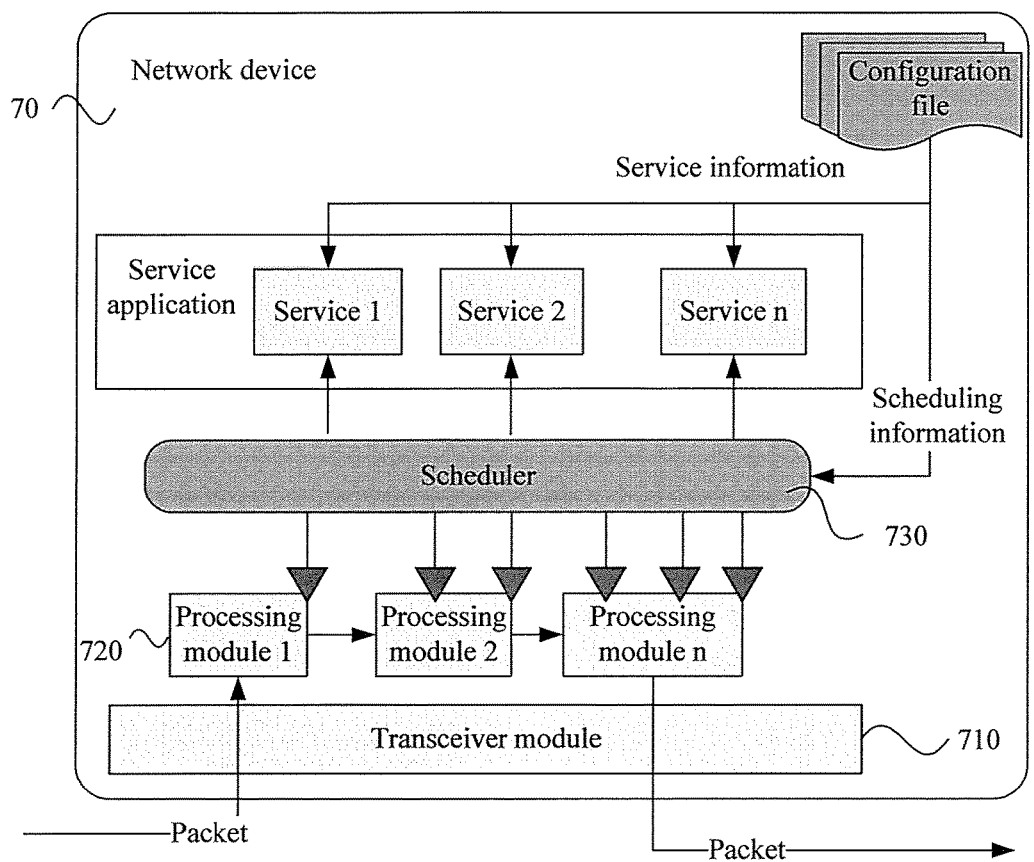
FIG. 7 is a schematic diagram of a network device according to an embodiment of the present invention.

As shown in FIG. 7, an embodiment of the present invention provides a network device. According to FIG. 7, one or more service applications (for example, service 1, service 2, and service n shown in FIG. 7) are deployed on a network device 70. The network device 70 includes a transceiver module 710, a scheduler 730, and multiple processing modules (this embodiment of the present invention uses a processing modules 720 shown in FIG. 7 as an example). Each data processing module can perform one type of processing on a packet, for example, a URL module can be configured to resolve a URL of the packet, an L1-L3 processing modules can perform layer1-3 processing on the packet, and a DPI processing module can perform deep identification on the packet, and so on. This embodiment of the present invention does not specifically limit a quantity and type of processing modules included in the network device.

The transceiver module 710 is configured to receive a packet and scheduling information of multiple services deployed on the network device 70, where the scheduling information of each service is used to indicate a policy of scheduling the service; and the scheduling information of each service may include but is not limited to a service rule of the service, information about a processing module on which the service depends, information about another service on which the service depends, and the like.

The scheduler 730 is configured to generate scheduling logic according to the scheduling information received by the transceiver module 710, where the scheduling logic includes an execution sequence of multiple processing modules that process the packet and a mapping relationship between each service and a scheduling point of each service, where the scheduling point of each service is a logical control point at which the scheduler schedules the service; invoke, according to the execution sequence included in the generated scheduling logic, a corresponding processing module successively to process the packet received by the network device 70; and invoke a corresponding service at each scheduling point according to the mapping relationship included in the scheduling logic.

In a specific embodiment, the scheduling information of the foregoing multiple services may be included in a configuration file that is configured by a user or generated by a network device. Before the service scheduling is performed, the transceiver module 710 can receive a configuration file delivered by the network device 70, and parse the configuration file to obtain the scheduling information of each service.

In another specific embodiment, the scheduler 730 first obtains information about processing modules and services deployed on the network device 70, that is, the scheduler 730 learns which processing modules and services are deployed on the network device 70, where a series of scheduling points may be provided inside a processing module, that is, it may be specified that a certain service is scheduled at one scheduling point inside a certain processing module. For example, it may be specified that the IPS service is scheduled when the parsing module completes parsing a header field of the packet. In addition, a series of scheduling points may be defined between processing modules. In this way, a certain service may be scheduled after a certain processing module completes processing the packet, for example, it may be specified that the ADC service is scheduled at a scheduling point between the parsing module and an L7 processing module. In this case, the ADC service is invoked after the parsing module completes parsing the packet and before the packet is sent to the L7 processing module for processing. The scheduling point herein is a logical control point at which the scheduler 730 performs service scheduling. After obtaining the information about the processing modules and services deployed on the network device 70, the scheduler further determines a scheduling point existing between processing modules and inside each processing module, a dependence relationship between the services, and the like, and generates the scheduling logic according to the scheduling information of each service. The scheduling logic includes the following main content:

(1) An execution sequence of all processing modules that need to process the packet (a sequence for processing the packet by these processing modules); and (2) Scheduling point information of each service that needs to be scheduled. Specifically, the scheduling point information of each service may include the mapping relationship between each service and the scheduling point of each service. For example, in an embodiment, an identifier of each service that needs to be scheduled may be associated with an identifier of a scheduling point at which the scheduler schedules the service, and information about the association is stored in a specific data structure to serve as the scheduling point information of the service.

In a specific embodiment, the scheduling information of each service of the multiple services deployed on the network device may specifically include the service rule of the service and the dependence relationship between the service and another service. In this situation, the scheduler may generate the scheduling logic according to the following manners:

determining, according to a condition included in all service rules corresponding to the multiple services, N processing modules that are required for determining whether the condition is met, and at least one scheduling point, between processing modules of the N processing modules and/or inside each processing module of the N processing modules, at which a service needs to be scheduled, and generating a mapping relationship between each scheduling point and a service that needs to be invoked at the scheduling point; where the network device includes M processing modules, M and N are positive integers greater than or equal to 1, and N is less than or equal to M; and determining an execution sequence of the N processing modules according to the dependence relationship between services of the multiple services, where the generated scheduling logic includes the execution sequence of the N processing modules and the mapping relationship between each scheduling point at which a service needs to be scheduled and a service that needs to be invoked at the scheduling point, where each scheduling point is between the processing modules of the N processing modules and/or inside each processing module of the N processing modules.

It should be noted that after the foregoing steps are executed, the scheduler 730 may integrate the determined execution sequence of the N modules and the foregoing mapping relationship to serve as the generated scheduling logic. Specifically, in this embodiment of the present invention, the scheduling logic may be presented in multiple manners, such as a configuration file, a command line or a chart, which is not specifically limited herein.

It should be noted that the scheduling point in this embodiment of the present invention is not limited to a scheduling point for scheduling after a processing module completes processing the packet, but also includes a scheduling point for scheduling at different stages of processing inside the processing module. For example, if the network device is configured with a URL filtering service, the scheduler 730 may schedule the URL filtering service after parsing of the header field is completed, and does not need to complete parsing the entire packet before scheduling the URL filtering service.

Further, in an embodiment, the transceiver module 710 is further configured to: after scheduling of each service is completed, send a network packet that has undergone processing by each processing module and each service.

Preferably, in another embodiment, after the scheduling logic is generated, the scheduler 730 may invoke, according to the determined execution sequence of the N processing modules, a corresponding processing module successively to process the packet received by the network device, to obtain N packet processing results. Specifically, the scheduler 730 may schedule a service according to the following manner.

The scheduler determines, at each scheduling point that is determined and according to the foregoing generated mapping relationship, all services corresponding to the scheduling point; then, the scheduler determines, according to at least one of the packet processing results, whether a scheduling condition of each service of all the services is met, and determines a service meeting the scheduling condition as the service that needs to be scheduled at the scheduling point. In an embodiment, if there is only one service that needs to be scheduled at the scheduling point, the scheduler invokes the service that needs to be scheduled directly at the scheduling point. In another embodiment, if there are multiple services that need to be scheduled at the scheduling point, the scheduler schedules, according to a descending order of a priority of each service of the services that need to be scheduled, services of different priorities that needs to be scheduled successively at the scheduling point.

It should be noted that a scheduling condition of a service is a policy of scheduling the service and is used to indicate a condition, and the service can be scheduled only when the condition is met. For example, in a scheduling condition if (IP=1.1.1.1 && HTTP. Host=www huawei corn) then invoke ADC, "IP=1.1.1.1" and "HTTP. host=www.huawei.com" are two parallel conditions, where the former is a layer3 condition and the latter is a layer7 condition, and the two conditions are in an "And" logical relationship. When both the two service conditions are met, the ADC service can be scheduled.

Preferably, in another embodiment, the scheduler 730 may further adjust, according to results of processing, on the packet received by the network device, by P processing modules among the N processing modules, an execution sequence of N-P processing modules, in addition to the P processing modules, among the N processing modules, and re-determine a scheduling point, between processing modules of the N-P processing modules and/or inside each processing module of the N-P processing modules, at which a service needs to be scheduled, where P is a positive integer greater than 1 and P is less than N. In this way, a scheduling policy may be adjusted dynamically according to a result of processing on the packet by the processing module, thereby further improving scheduling flexibility and performance.

It should be noted that functions of functional modules in the network device 70 may be specifically implemented according to the method in the foregoing method embodiments. For details about a specific implementation process, reference may be made to related descriptions of the foregoing method embodiments, and details are not repeatedly described herein. In addition, the functional modules of the network device 70 may be functional modules implemented by software, and may also be implemented by using a hardware circuit in a case regardless of costs. For example, the transceiver module 710 may be a hardware unit with a communication function, such as a network adapter, a radio frequency module, a Wi-Fi chip, and the like; the scheduler 730 may be a central processing unit (Central Processing Unit, CPU for short) or be an application specific integrated circuit (Application Specific Integrated Circuit, ASIC for short) or be configured as one or more integrated circuits that implement functions of the scheduler in this embodiment of the present invention; and the processing module may be a CPU, one core in a multi-core processor, a logical circuit with a processing function, or the like. The manner of invoking a service at a scheduling point by the scheduler 730 includes but is not limited to a manner of registering a callback function, hardware/software interruption, and a manner of triggering by a trigger.

Figure 8:
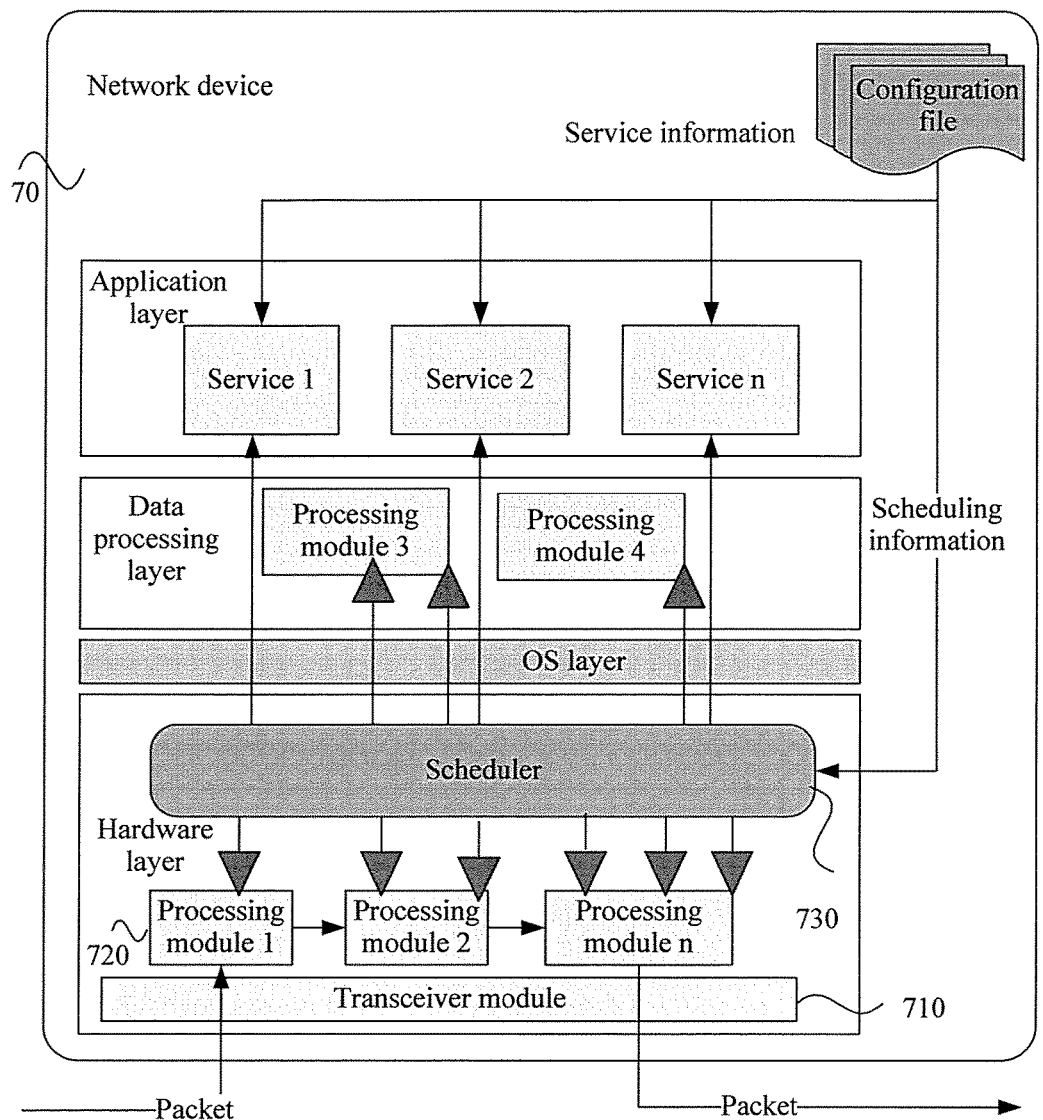
FIG. 8 is a schematic diagram of another network device according to an embodiment of the present invention.

In a scenario with a single device or a single system, the scheduler 730 in this embodiment of the present invention may be deployed at a base layer of the network device 70. As shown in FIG. 8, a user configures service information and scheduling information by using a configuration file, and the system delivers the service information to each service to perform policy control, and delivers the scheduling information to the scheduler 730 to generate scheduling logic. The user may configure a configuration file including the service information and the scheduling information onto the network device 70, and may also configure the configuration file onto another device of the system. The base layer herein may be an operating system, and may also be a third-party Libraries layer, and may also be a logical layer similar to an SDK (Software Development Kit, software development kit) that screens a hardware difference.

In a scenario where there is a higher scheduling requirement, as shown in FIG. 8, the scheduler 730 may be implemented at a hardware layer, and the scheduler 730 may schedule a processing module (for example, processing module 1, processing module 2, and processing module 3 shown in FIG. 8) that is also deployed at the hardware layer, and may also schedule a processing module (for example, processing module 3 and processing module 4 shown in FIG. 8) implemented by software. Similarly, the user may configure a configuration file including the service information and the scheduling information onto the network device 70, and may also configure the configuration file onto another device of the system. After the scheduler 730 generates the scheduling logic according to the scheduling information of each service, the scheduler 730 needs to compile the scheduling logic in a unified manner and then writes the compiled scheduling logic into the hardware for execution, thereby improving scheduling execution efficiency.

Figure 9:
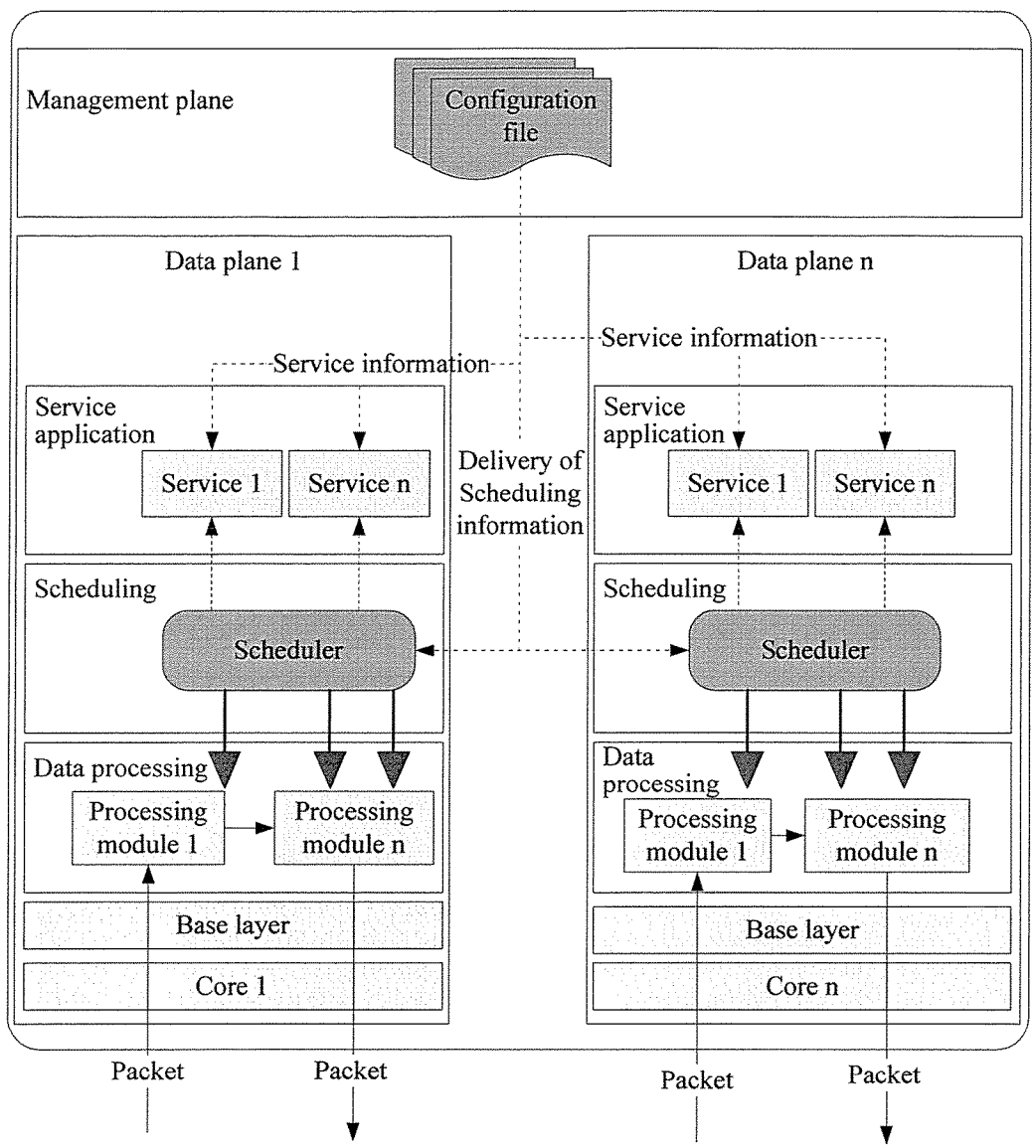
FIG. 9 is a schematic diagram of another network device according to an embodiment of the present invention.

In a multi-core scenario, as shown in FIG. 9, each service and each processing module deployed on a network device are running on each independent processor core, and a packet of each data stream enter only one core for processing. At this time, a scheduler is deployed on multiple cores in a distributed manner, that is, a scheduling module is deployed on each core independently to execute a function same as the scheduler. In this way, each core may be considered as an independent service processing system. At this time, scheduling information needs to be delivered to the scheduling module on each processor core. Similar to the foregoing scenario, the scheduling module deployed on each core may be implemented at a software layer above the base layer, and may also be implemented in a hardware manner, and details are not repeatedly described herein.

Figure 10:
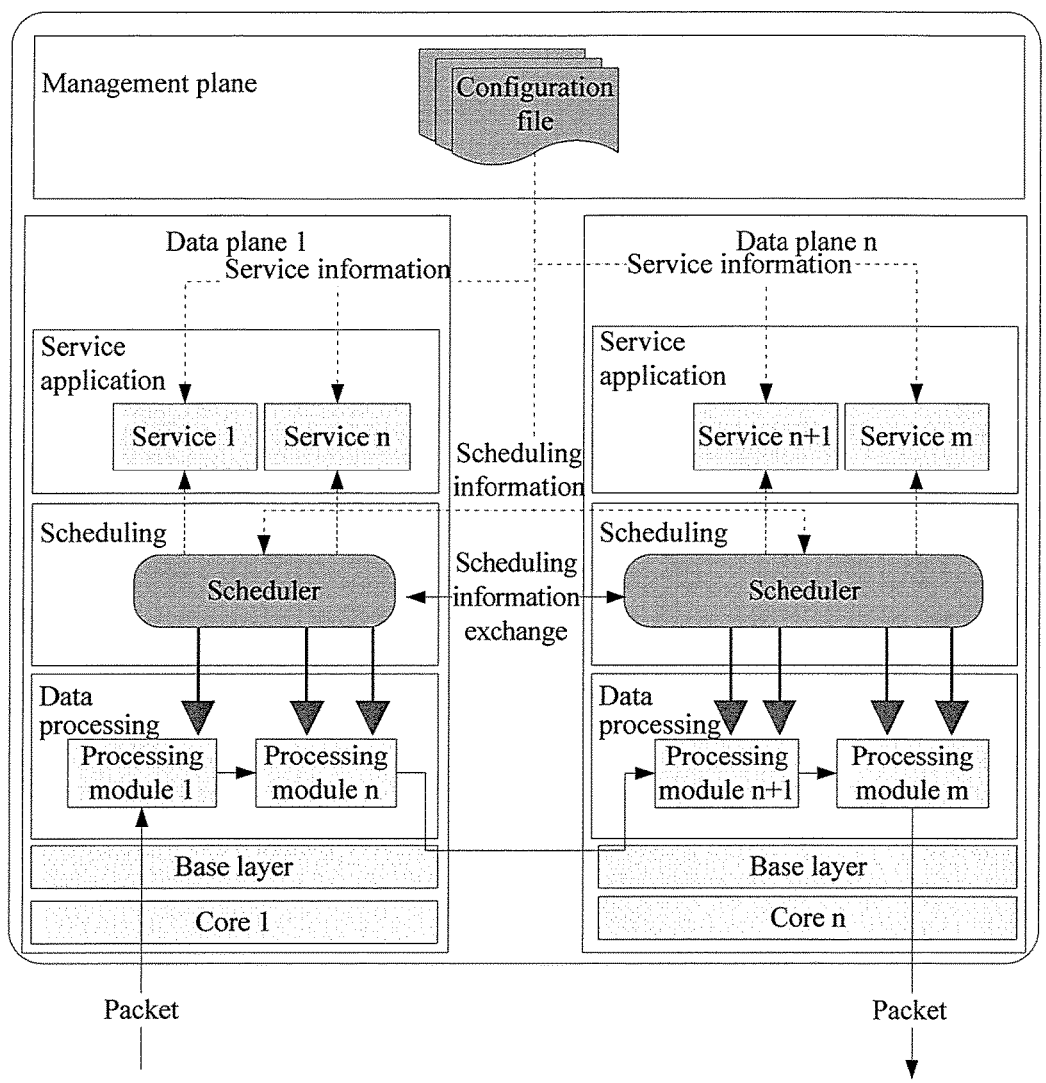
FIG. 10 is a schematic diagram of another network device according to an embodiment of the present invention.

In another multi-core scenario, as shown in FIG. 10, services and processing modules deployed on each core of a network device are different; each core processes only apart of services, and a packet of each data stream enter one or more cores for processing. In addition, a scheduler is also deployed on multiple cores in a distributed manner, that is, a scheduling module is deployed on each core independently to execute a function same as the scheduler. In this case, the scheduling module deployed on each core needs to transfer related information to ensure that scheduling information on the same stream is unified in the system. Specifically, the scheduling information needs to be delivered to the scheduler on each core, and the scheduler deployed on each core generates it own scheduling logic according to the scheduling information and information about services running on each core, and invokes, according to the generated scheduling logic, a corresponding processing module to process a packet received by the receiving module. In addition, after a core completes packet processing and service scheduling, the core needs to synchronize the scheduling information and a result of processing on the packet performed by a processing module with a next core that processes the packet. That is, in this scenario where multiple cores perform cooperative processing, schedulers on different cores further need to exchange scheduling information.

It should be noted that, for specific implementation details about the network device in this embodiment of the present invention, reference may be made to the foregoing method and apparatus embodiments, and details are not repeatedly described herein.

In a network device provided by this embodiment of the present invention, a scheduler is used to implement flexible scheduling of multiple services; a conventional packet processing process is segmented in detail, and multiple service scheduling points are defined. In addition, service scheduling logic is dynamically according to scheduling information of a service, and flexible scheduling of multiple services is implemented according to the scheduling logic, which avoids repeated scheduling, improves flexibility and performance of service scheduling, and increases competitiveness of the network device.

Figure 11:
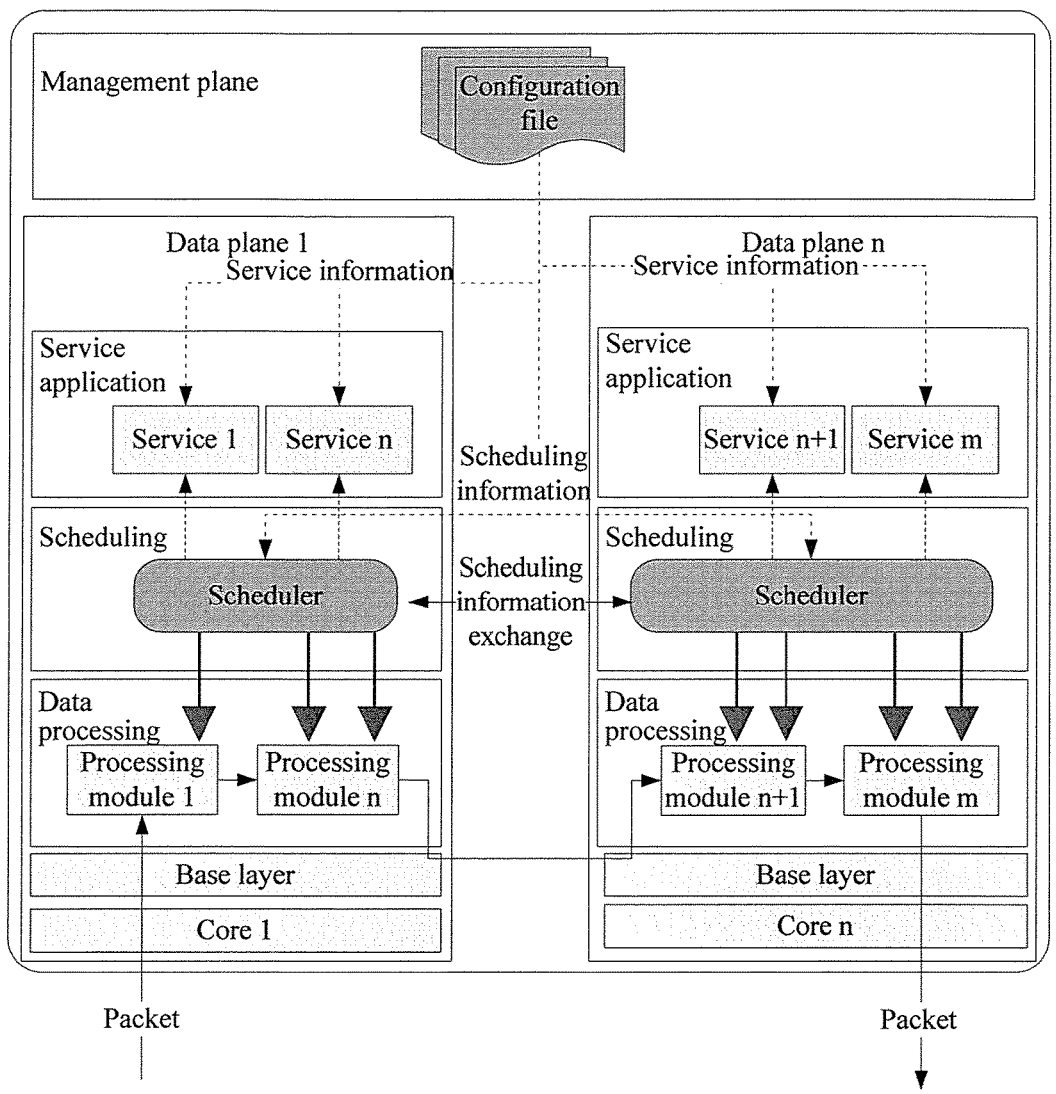
FIG. 11 is a schematic diagram of a service scheduling apparatus according to an embodiment of the present invention.

The following describes another apparatus embodiment used to implement the foregoing method. As shown in FIG. 11, an embodiment of the present invention provides a service scheduling apparatus 11, including: an obtaining module 110, a scheduling logic generating module 120, and a scheduling module 130.

The obtaining module 110 is configured to obtain scheduling information of multiple services deployed on a network device.

The scheduling information of each service is used to indicate a policy of scheduling the service. The scheduling information of each service may include but is not limited to policy information of the service, information about a processing module on which the service depends, information about another service on which the service depends, and the like. It should be noted that a scheduling point in this embodiment of the present invention is determined by a combination of a service and a processing module, and a processing module is configured to perform specific processing on a packet, for example, IP fragmentation processing, data stream management, L1-L3 processing, L7 processing, and the like.

In an embodiment, the scheduling information of each foregoing service may be an explicitly specified rule or timing for scheduling the service, for example, the scheduling information may be used to instruct the scheduler to schedule a certain service after a specific processing module completes processing the packet or to schedule a certain service after a stage at which a specific processing module completes specific processing on the packet. For example, it may be specified that an IPS service is scheduled after layer 4 processing on the packet is completed and an ADC service is scheduled after parsing of a header field of the packet is completed. Further, the scheduling information may further include scheduling information of a specific data stream specified for a service. For example, when an ADC service is configured, the scheduler may be specified to process data streams of an 8080 port only or process data streams of a specific IP or a specific protocol, or the like.

In another embodiment, the scheduling information of each service may also be scheduling information that is implicitly specified by extracting from a service rule of the service in a manner such as parsing and extraction. That is, determining, according to a condition included in a service rule corresponding to the service, processing modules that perform specific processing on the packet and on which determination of the condition included depends, as well as information about the modules on which the service depends. It should be noted that a service rule is a rule to be followed when a service is executed. One service rule includes two parts: a condition and an action. Specifically, one service rule may include one or more conditions and multiple conditions in the same service rule may be related to packet information of different levels or different dimensions, or more precisely, if it is to determine whether each service rule is matched, it needs to determine whether a condition included in the service rule is met. However, determination of the condition in the service rule depends on at least information about one dimension of the packet. For example, in a rule if (IP=1.1.1.1 && HTTP.host=www.huawei.com) then do ADC, "IP=1.1.1.1" and "HTTP. host=www.huawei.com" are two parallel conditions, where the former is a layer3 condition and the latter is a layer7 condition, and the two conditions are in an "And" logical relationship. Therefore, the execution of the ADC service needs to depend on that layer 3 and layer 7 processing on the packet is completed.

Using the IPS service as an example, assuming that a service rule included in the IPS service is if (HTTP.Request.URL==www.huawei.com) {do action}, scheduling information of the service may be obtained by parsing the service rule, where the scheduling information includes the following: A scheduling position is at a request direction of a stream; an identifying module needs to be scheduled to identify a protocol of a data stream; and if the protocol is the HTTP protocol, a parsing module also needs to be invoked to obtain, by parsing, URL information.

In a more exemplary embodiment, the scheduling information further includes priority information of the service. For example, both the IPS service and the ADC service may be scheduled during layer 7 processing, and a priority may be configured, so that the IPS service is scheduled before the ADC service.

It should be noted that the scheduling information of the foregoing multiple services may be included in a configuration file that is configured by a user or generated by the network device. Before service scheduling is performed, the obtaining module 110 may parse the configuration file to obtain the scheduling information of each service. In this way, integration of the service and the service scheduling apparatus is implemented.

The scheduling logic generating module 120 is configured to generate scheduling logic according to the scheduling information of the multiple services obtained by the obtaining module 110, where the scheduling logic includes an execution sequence of multiple processing modules that process the packet and a mapping relationship between each service and a scheduling point of each service, where the scheduling point of each service is a logical control point at which the scheduler schedules the service.

Specifically, the scheduling logic generating module 120 first obtains information about processing modules and services deployed on the network device, that is, the scheduling logic generating module 120 learns which processing modules and services are deployed on the network device, where a series of scheduling points may be provided inside a processing module, that is, it may be specified that a certain service is scheduled at one scheduling point inside a certain processing module. For example, it may be specified that the IPS service is scheduled when the parsing module completes parsing the header field of the packet. In addition, a series of scheduling points may be defined between processing modules. In this way, a certain service may be scheduled after a certain processing module completes processing the packet, for example, it may be specified that the ADC service is scheduled at a scheduling point between the parsing module and an L7 processing module. In this case, the ADC service is invoked after the parsing module completes parsing the packet and before the packet is sent to the L7 processing module for processing. The scheduling point herein is a logical control point at which the service scheduling apparatus performs service scheduling. After obtaining the information about the processing modules and services deployed on the network device, the scheduling logic generating module 120 further determines a scheduling point existing between processing modules and inside each processing module, a dependence relationship between services, and the like, and generates the scheduling logic according to the scheduling information of each service. The scheduling logic includes the following main content:

(1) An execution sequence of all processing modules that need to process the packet (a sequence for processing the packet by these processing modules); and (2) Scheduling point information of each service that needs to be scheduled. Specifically, the scheduling point information of each service may include the mapping relationship between each service and the scheduling point of each service. For example, in an embodiment, an identifier of each service that needs to be scheduled may be associated with an identifier of a scheduling point at which the scheduler schedules the service, and information about the association is stored in a specific data structure to serve as the scheduling point information of the service.

In a specific embodiment, the scheduling information of each service of the multiple services deployed on the network device may specifically include the service rule of the service and the dependence relationship between the service and another service. In this situation, the scheduling logic generating module 120 specifically includes:

a mapping unit, configured to determine, according to a condition included in all service rules corresponding to the multiple services, N processing modules that are required for determining whether the condition is met, and at least one scheduling point, between processing modules of the N processing modules and/or inside each processing module of the N processing modules, at which a service needs to be scheduled, and generate a mapping relationship between each scheduling point and a service that needs to be invoked at the scheduling point; where the network device includes M processing modules, M and N are positive integers greater than or equal to 1, and N is less than or equal to M; and a sorting unit, configured to determine an execution sequence of the N processing module according to the dependence relationship between services of the multiple services, where the generated scheduling logic includes the execution sequence of the N processing modules and the mapping relationship between each scheduling point at which a service needs to be scheduled and a service that needs to be invoked at the scheduling point, where each scheduling point is between processing modules of the N processing modules and/or inside each processing module of the N processing modules.

It should be noted that the scheduling logic generating module 120 may integrate the determined execution sequence of the N modules and the foregoing mapping relationship to serve as the generated scheduling logic. Specifically, in this embodiment of the present invention, the scheduling logic may be presented in multiple manners, such as a configuration file, a command line or a chart, which is not specifically limited herein.

It should be noted that the scheduling point in this embodiment of the present invention is not limited to a scheduling point for scheduling after a processing module completes processing the packet, but also includes a scheduling point for scheduling at different stages of processing inside the processing module. For example, if the network device is configured with a URL filtering service, the scheduling logic generating module 120 may schedule the URL filtering service after parsing of the header field is completed, and does not need to finish complete parsing the entire packet before scheduling the URL filtering service.

The scheduling module 130 is configured to invoke, according to the execution sequence included in the scheduling logic generated by the scheduling logic generating module 120, a corresponding processing module successively to process a packet received by the network device, and invoke a corresponding service at each scheduling point according to the mapping relationship included in the scheduling logic.

Specifically, the scheduling module 130 determines, at each scheduling point determined by the scheduling logic generating module 120 and according to the mapping relationship generated by the scheduling logic generating module 120, all services corresponding to the scheduling point; then, the scheduling module 130 determines, according to at least one packet processing results, whether a scheduling condition of each service of all the services is met, and determines a service meeting the scheduling condition as a service that needs to be scheduled at each scheduling point. In an embodiment, if there is only one service that needs to be scheduled at the scheduling point, the scheduling module 130 invokes the service that needs to be scheduled directly at the scheduling point. In another embodiment, if there are multiple services that needs to be scheduled at the scheduling point, the scheduling module 130 schedules, according to a descending order of a priority of each service of the services that need to be scheduled, services of different priorities that needs to be scheduled successively at the scheduling point.

It should be noted that a scheduling condition of a service is a policy of scheduling the service and is used to indicate a condition, and the service can be scheduled only when the condition is met.

Preferably, in an embodiment, the service scheduling apparatus 11 further includes: an adjusting module 140, configured to adjust, according to results of processing, on the packet received by the network device, by P processing modules among the N processing modules, an execution sequence of N-P processing modules, in addition to the P processing modules, among the N processing modules, and re-determine a scheduling point, between processing modules of the N-P processing modules and/or inside each processing module of the N-P processing modules, at which a service needs to be scheduled, where P is a positive integer greater than 1 and P is less than N. In this way, a scheduling policy may be adjusted dynamically according to a result of processing on the packet by the processing module, thereby further improving scheduling flexibility and performance.

It may be understood that the functions of functional modules of the service scheduling apparatus 11 in this embodiment may be specifically implemented according to the method in the foregoing method embodiments. For details about a specific implementation process, reference may be made to related descriptions of the foregoing method embodiments, and details are not repeatedly described herein. In addition, the functional modules of the service scheduling apparatus 11 may be functional modules implemented by software, and may also be implemented by using a hardware circuit in a case regardless of costs. For example, the obtaining module 110 may be a hardware unit with a communication function, such as a network adapter, a radio frequency module, a Wi-Fi chip, and the like; the scheduling logic generating module 120 and the scheduling module 130 may be a central processing unit (Central Processing Unit, CPU for short) or an application specific integrated circuit (Application Specific Integrated Circuit, ASIC for short) or be configured as one or more integrated circuits that implement functions of the logic generating module and the scheduling module provided by in embodiment of the present invention.

In the service scheduling apparatus provided by this embodiment of the present invention, a conventional packet processing process is segmented in detail, and multiple service scheduling points are defined. In addition, service scheduling logic is dynamically determined according to scheduling information of a service; and flexible scheduling of multiple services is implemented according to the scheduling logic, which avoids repeated scheduling, improves flexibility and performance of service scheduling, and increases competitiveness of the network device.

Figure 12:
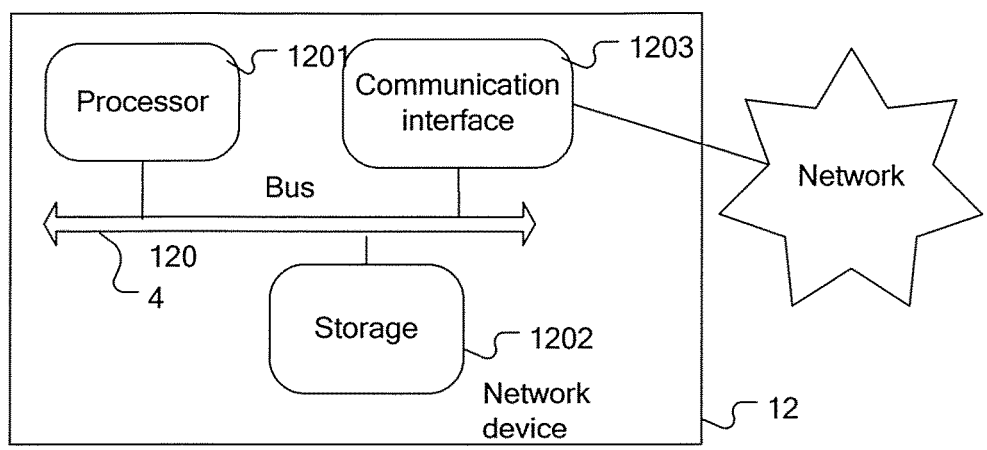
FIG. 12 is a schematic diagram of a network device according to an embodiment of the present invention.

FIG. 12 is a schematic diagram of a network device according to an embodiment of the present invention. As shown in FIG. 12, a network device 12 includes at least one processor 1201, a storage 1202, a communication interface 1203, and a bus 1204. The processor 1201, the storage 1202, and the communication interface 1203 are connected and implement mutual communication by using the bus 1204. The bus 1204 may be an industry standard architecture (Industry Standard Architecture, ISA for short) bus, a peripheral component interconnect (peripheral component interconnect, PCI for short) bus, an extended industry standard architecture (Extended Industry Standard Architecture, EISA for short) bus, or the like. The bus may be divided into an address bus, a data bus, a control bus, and the like. For ease of description, the bus in FIG. 12 is represented by using one bold line only, but it does not mean that there is only one bus or one type of bus.

The storage 1202 is configured to store executable program code, where the program code includes a computer operation instruction. The storage 1202 may include a high speed RAM memory, and may also include a non-volatile memory (non-volatile memory), for example, at least one magnetic disk storage. The storage 1202 may optionally include a storage apparatus located far away from the foregoing processor 1201.

In an embodiment, the processor 1201 reads and executes an executable program stored in the storage 1202, so as to:

receive scheduling information of multiple services by using the communication interface 1203, where the communication interface 1203 may be a component or a unit that can implement data reception and transmission functions, for example, a network port, a USB interface, a radio frequency unit, an antenna, a Wi-Fi communications module and the like;

generate scheduling logic according to the scheduling information of each service of the multiple services, where the scheduling logic includes an execution sequence of multiple processing modules that process a packet, and a mapping relationship between each service and a scheduling point of each service, where the scheduling point of each service is a logical control point at which the scheduler schedules the service; and invoke, according to the execution sequence included in the generated scheduling logic, each processing module of the multiple processing modules successively to process a packet received by the network device, and invoke a corresponding service at each scheduling point according to the mapping relationship included in the scheduling logic.

For specific details about the foregoing process, reference may be made to the foregoing method and apparatus embodiments, and details are not repeatedly described herein.

The processor 1201 may be a central processing unit (Central Processing Unit, abbreviated as CPU), or an application specific integrated circuit (Application Specific Integrated Circuit, abbreviated as ASIC), or be configured as one or more integrated circuits that implement the embodiments of the present invention.

It should be noted that besides the foregoing functions, the processor 1201 may be further configured to execute other processes in the foregoing method embodiments, and details are not repeatedly described herein.

In the several embodiments provided in the present application, it should be understood that the disclosed service scheduling apparatus and method, and network device may be implemented in other manners. For example, the apparatus embodiment described above is only exemplary.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in network devices provided by the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method implemented by a network device that receives a packet for performing processing on the packet by scheduling a set of processing modules that each perform a specific type of processing on the packet, and for invoking a plurality of services while the processing on the packet is performed, the method comprising:
   receiving the packet over a communications port of the network device;
   obtaining, by a scheduler of the network device, scheduling information,
   wherein the scheduling information comprises service rules and dependence relationships of the plurality of services,
   wherein a service rule of each service of the plurality of services comprises one or more conditions that must be met by one or more packet processing results obtained by the set of processing modules in order for that service to be executed, and
   wherein a dependence relationship of each service of the plurality of services comprises at least one of information about the packet processing results of at least one processing module on which execution of a service of the plurality of services depends, or at least one other service of the plurality of services on which execution of the at least one other service depends;
   generating, by the scheduler, scheduling logic according to the scheduling information,
   wherein the scheduling logic indicates an execution sequence of the set of processing modules for processing the packet, scheduling points during the execution sequence that occur after each processing module of the set of processing modules completes processing the packet, and mappings between the plurality of services and the scheduling points such that each of the plurality of services is mapped to a particular scheduling point and such that the dependence relationships of the plurality of services are satisfied;
   processing the packet by the network device by executing the set of processing modules according to the execution sequence as indicated by the scheduling logic;
   invoking, at each scheduling point, all services mapped to that scheduling point with conditions that are met by the packet processing results of the processing modules;
   determining, at the particular scheduling point during processing of the packet by the network device, that a condition of a particular service of the plurality of services mapped to the particular scheduling point is not met by the packet processing results of the processing modules; and
   adjusting the execution sequence of remaining processing modules and the mappings between the plurality of services and the scheduling points.

2. The method according to claim 1, wherein the scheduling information of the plurality of services is obtained by parsing a configuration file.

3. The method according to claim 1, wherein generating the scheduling logic according to the scheduling information comprises:
   determining, according to conditions comprised in the service rules of the plurality of services, the set of processing modules, wherein the set of processing modules are required for extracting information from the packet for verifying the conditions; and
   determining, according to the dependence relationships of the plurality of services, the execution sequence of the set of processing modules and the scheduling points.

4. The method according to claim 1, wherein the scheduling information of the plurality of services further comprises priorities of the plurality of services, and wherein invoking, at each scheduling point, all services mapped to that scheduling point comprises invoking, according to a descending order of priorities of the services mapped to that scheduling point, the services at that scheduling point.

5. A network device, comprising:
- a transceiver configured to receive a packet;
- a plurality of processing modules coupled to the transceiver and configured to execute a plurality of services deployed on the network device, wherein each of the processing modules is configured to perform a specific type of processing on the packet; and
- a scheduler coupled to the processor and configured to:
    - obtain scheduling information, wherein the scheduling information comprises service rules and dependence relationships of the plurality of services, wherein a service rule of each service of the plurality of services comprises one or more conditions that must be met by one or more packet processing results obtained by the processing modules in order for that service to be executed, and wherein a dependence relationship of each service of the plurality of services comprises at least one of information about the packet processing results of at least one processing module on which the execution of a service of the plurality of services depends, or at least one other service of the plurality of services on which execution of the at least one other service depends;
    - generate scheduling logic according to the scheduling information, wherein the scheduling logic indicates an execution sequence of the processing modules for processing the packet, scheduling points during the execution sequence that occur after each processing module completes processing the packet, and mappings between the plurality of services and the scheduling points such that each of the plurality of services is mapped to a particular scheduling point and such that the dependence relationships of the plurality of services are satisfied;
    - process the packet by the network device by executing the processing modules according to the execution sequence as indicated by the scheduling logic;
    - invoke, at each scheduling point, all services mapped to that scheduling point with conditions that are met by the packet processing results of the processing modules;
    - determine, at the particular scheduling point during processing of the packet by the network device, that a condition of a particular service of the plurality of services mapped to the particular scheduling point is not met by the packet processing results of the processing modules; and
    - adjust the execution sequence of remaining processing modules and the mappings between the plurality of services and the scheduling points.

6. The network device according to claim 5, wherein the scheduler is configured to parse a configuration file to obtain the scheduling information of the plurality of services.

7. The network device according to claim 5, wherein the scheduler is configured to:
- determine, according to conditions comprised in the service rules of the plurality of services, the processing modules, wherein the processing modules are required for extracting information from the packet for verifying the conditions; and
- determine, according to the dependence relationships of the plurality of services, the execution sequence of the set of processing modules and the scheduling points.

8. The network device according to claim 5, wherein the scheduling information of the plurality of services further comprises priorities of the plurality of services, and wherein the scheduler is configured to invoke, according to a descending order of priorities of the services mapped to that scheduling point, the services at that scheduling point.

9. A network device, comprising:
- a storage medium configured to store executable programs;
- a processor coupled to the storage medium to execute the executable programs to generate a plurality of processing modules required for execution of a plurality of services deployed on the network device, wherein each of the processing modules performs a specific type of processing on a packet received by the network device;
- wherein the processor is further configured to execute the executable programs stored in the storage medium to:
    - obtain scheduling information,
        - wherein the scheduling information comprises service rules and dependence relationships of the plurality of services,
        - wherein a service rule of each service of the plurality of services comprises one or more conditions that must be met by one or more packet processing results obtained by the set of processing modules in order for that service to be executed, and
        - wherein a dependence relationship of each service of the plurality of services comprises at least one of information about the packet processing results of at least one processing module on which the execution of a service of the plurality of services depends, or at least one other service of the plurality of services on which execution of the at least one other service depends:
    - generate scheduling logic according to the scheduling information,
        - wherein the scheduling logic indicates an execution sequence of the set of processing modules for processing the packet, scheduling points during the execution sequence that occur after each processing module of the processing modules completes processing the packet, and mappings between the plurality of services and the scheduling points such that each of the plurality of services is mapped to a particular scheduling point and such that the dependence relationships of the plurality of services are satisfied;
    - process the packet by the network device by executing the set of processing modules according to the execution sequence as indicated by the scheduling logic;
    - invoke, at each scheduling point, all services mapped to that scheduling point with conditions that are met by the packet processing results of the processing modules;
    - determine, at the particular scheduling point during processing of the packet by the network device, that a condition of a particular service of the plurality of services mapped to the particular scheduling point is not met by the packet processing results of the processing modules; and
    - adjust the execution sequence of remaining processing modules and the mappings between the plurality of services and the scheduling points.

10. The network device according to claim 9, wherein the scheduling information of the plurality of services is obtained by parsing a configuration file.

11. The network device according to claim 9, wherein the processor is configured to execute the executable programs stored in the storage medium to:
- determine, according to conditions comprised in the service rules of the plurality of services, the set of processing modules, wherein the processing modules are required for extracting information from the packet for verifying the conditions; and
- determine, according to the dependence relationships of the plurality of services, the execution sequence of the processing modules and the scheduling points.

12. The network device according to claim 9, wherein the scheduling information of the plurality of services further comprises priorities of the plurality of services, and wherein the processor is configured to execute the executable programs stored in the storage medium to invoke, according to a descending order of priorities of the services mapped to that scheduling point, the services at that scheduling point.

13. The network device according to claim 9, wherein the plurality of processing modules are running on multiple processor cores of the processor.

\* \* \* \* \*